Sept. 8, 1953  V. P. M. BALLU  2,651,248
IMPLEMENT ATTACHING DEVICE FOR TRACTORS
Filed Feb. 23, 1949  3 Sheets-Sheet 1
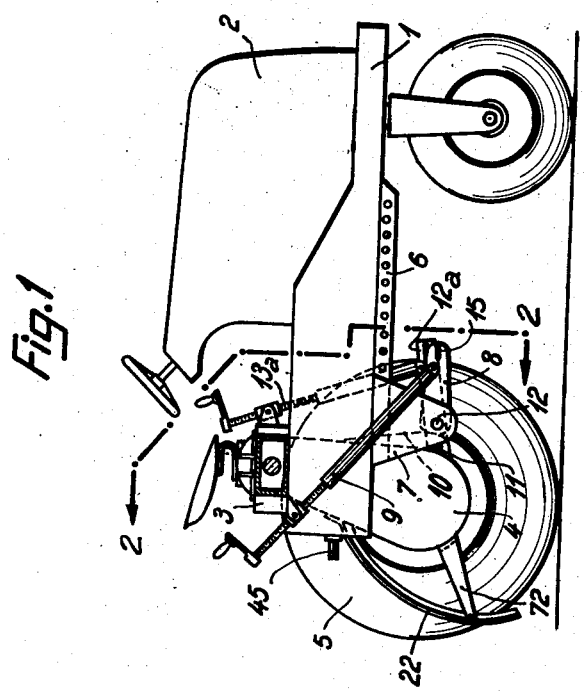
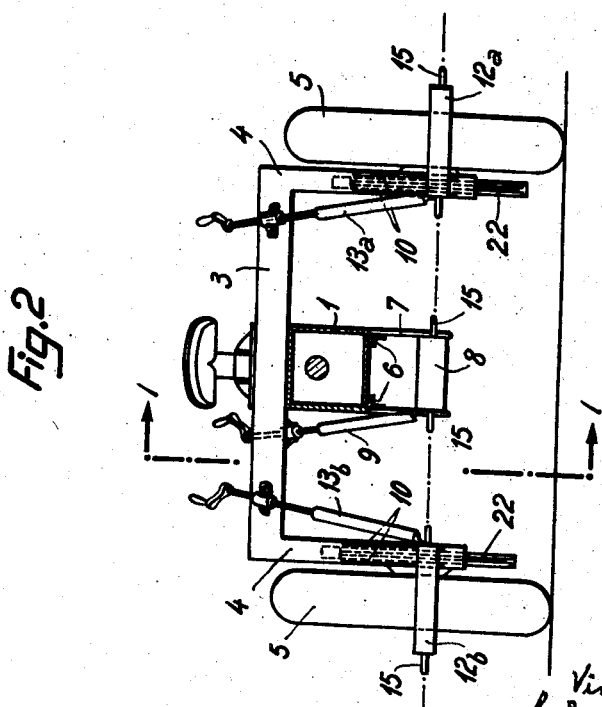
Inventor
Vincent P. M. Ballu
by Stevens, Davis, Miller & Mosher
his attorneys

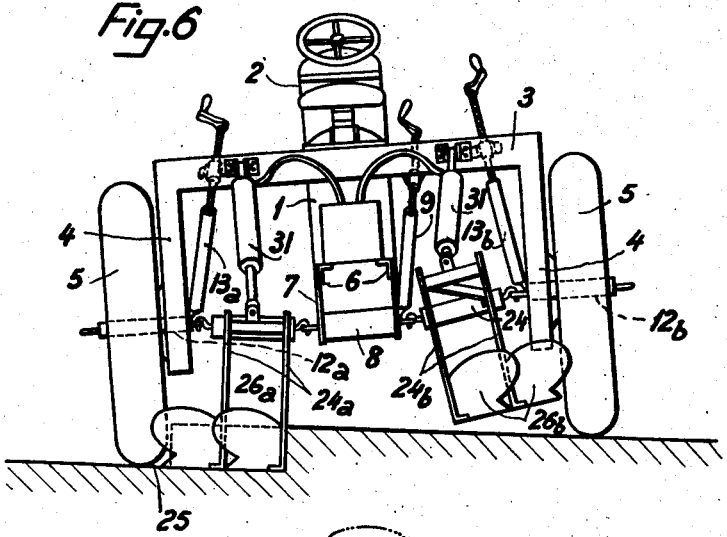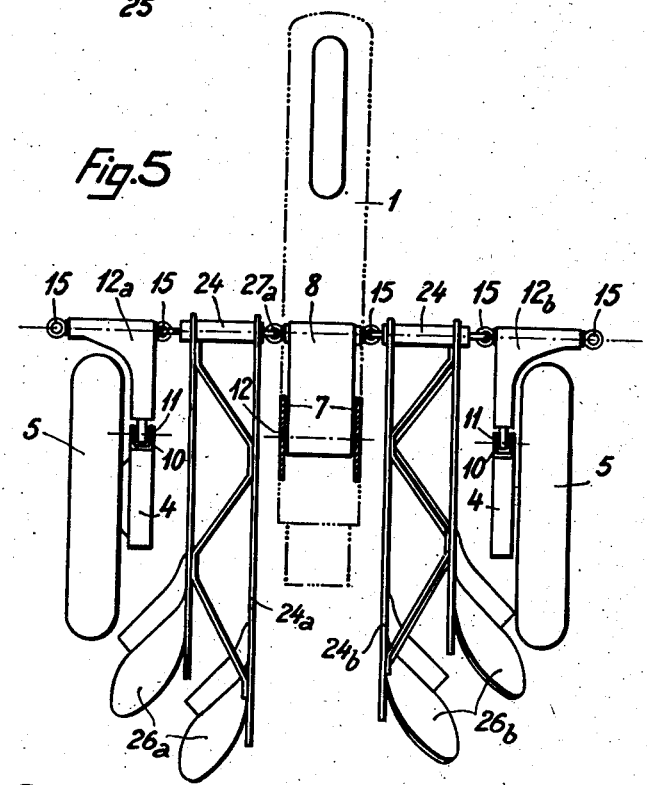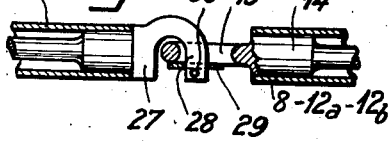

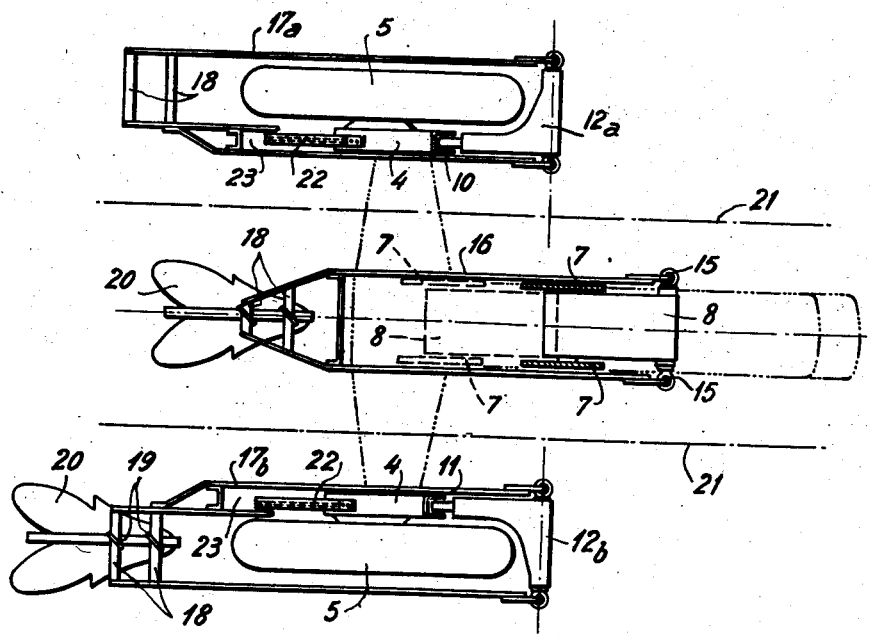

Patented Sept. 8, 1953

2,651,248

UNITED STATES PATENT OFFICE 2,651,248

IMPLEMENT ATTACHING DEVICE FOR TRACTORS

Vincent P. M. Ballu, Epernay, France, assignor to Etablissements Edgar Brandt (Societe Anonyme), Paris, France, a company of France Application February 23, 1949, Serial No. 77,868
In France March 1, 1948

3 Claims. (Cl. 97—47.44)

In the application for U. S. patent, Serial No. 8,877, filed on February 17, 1948, an agricultural tractor has been described whose driving wheels stride over an even number of culture rows, whereas its steering wheel lies in the free median space between these rows.

The tractor described in the said U. S. patent application is such that the members transmitting power from the engine to the driving wheels (the engine is carried by the frame in the median space) are located high enough above the ground, for allowing the tractor to stride over at least two culture rows of fairly high plants.

If this tractor is not used for work in rows of fairly high plants, the free space of important height underneath the frame, between the driving wheels can be put to profit for numerous and interesting applications whose common feature is that the said free space is used at a maximum for setting in position implements or accessories carried or towed by the tractor, so that the overall length is much reduced. It is easy to realize considering the ease in operating how convenient is a short agricultural machine capable of turning along curves of very small radii and to only give rise, at the end of a field, to very narrow waste land.

In the said U. S. patent application, it has been said that the tractor could be equipped with a plow, set in the main axis of the frame, and whose beam was held under it in front of the driving wheels. This arrangement merely allows of plowing in the median space between the culture rows.

The present invention has for its object to provide an implement attaching device for a tractor of the above type permitting the attachment of a central plow, as well as two side ones. This device includes three pairs of implement attaching means, for instance ring-shaped members or the like, one pair being supported on the central frame of the tractor and the other two pairs being located ahead of the two driving wheels of the tractor.

However instead of attaching three plows, only two may be set, in the free spaces between the central frame and the driving wheels. By the alternate operation of the two plows, flat plowing is achieved as known.

The positions of the three pairs of attaching means above the ground are adjustable independently of each other. For this purpose, each pair is mounted on a vertically displaceable support.

This arrangement facilitates adjusting singly the three plows when operating in culture rows and has a further advantage in the case of flat plowing by means of alternate plows. Indeed, it is possible, by means of adjusting devices, to incline laterally with respect to the tractor, the plane of the plowshares of each alternate plow, so as to compensate for the varying slant of the tractor due, for instance, to the fact that one of its wheels rolls over a ridge whereas the other is in a previously dug furrow; this arrangement facilitates the use of multiple alternate plows whose digging depths may thus all be equal to each other.

Other objects and advantages of the invention will be apparent during the course of the following description.

In the accompanying drawing in which like numerals are employed to designate like parts throughout the same, Fig. 1 is a side elevation of the improved tractor with partial section along line 1—1 of Fig. 2, Fig. 2 is a view according to section line 2—2 of Fig. 1, Fig. 3 is a detail of the attachment devices, Fig. 4 is a diagrammatic plan view of the tractor equipped with three plows, Fig. 5 is also a diagrammatic plan view of the tractor equipped with a two alternate plow system, Fig. 6 is an elevation view of the hind part of the tractor operating in alternate plowing.

The tractor shown in these figures comprises a fairly narrow frame 1 carrying at the front the engine 2 and at the rear, a much upswept portion 3 carrying housings 4 inside which are the power driving parts for the driving wheels 5. Underneath the frame, as stated in the said U. S. patent application, are set edgewise two perforated angle-irons 6 for attaching implements.

To these angle-irons or directly to the frame is secured a flange 7 carrying the pivot 12 of a lever 8, which forms the central support of an implement attaching means. This flange can be adjusted at various points along the frame. The position of this lever may be adjusted by means of a hoisting device 9 constituted for instance by a worm rotated by means of a crank and cooperating with a fixed nut. Each housing 4 carries brackets 10 carrying an axle 11 on which are hinged lateral supports 12a and 12b for the implement attaching means. These supports are generally L-shaped.

As in the case of the central support, the position of each lateral support may be adjusted by means of a hoisting device (13a or 13b) similar to the previous device 9.

In practice, axles 11 and 12 are conveniently set in line with one another. Nevertheless they are shifted in Fig. 1 for clearness sake.

Similarly, the lengths of lever 8 and of supports 12a and 12b are conveniently equal to each other. Moreover, the adjusting devices (9, 13a, 13b) act at the same distance of the respective pivoting joint on each attachment support and their worms have the same pitch. Thus, a same number of turns of the crank in the same direction causes identical variations of the position of the attachment supports.

At the fore ends of the supports (8, 12a and 12b), there are provided ring-shaped members 15 whose object will be explained with reference to Figs. 4 and 5.

As shown in plan-view in Fig. 4, implement carrying fork-shaped members 16, 17a and 17b are attached to the ring-shaped members 15 and extend rearwardly therefrom.

In the shown example, these fork-shaped members are provided, towards the rear with ties 18 to which may be secured by means of flanges 19, plows such as 20 or occasionally other implements.

For the digging depths to be the same, these three fork-shaped members must all have the same length. Nevertheless the implements are preferably given an arrow shape arrangement, favorable for stability, by shifting forward the flange 7.

It is easy to realize that, in the case of plows, the length of the links formed by the fork-shaped members 16, 17a and 17b ensures, in the vertical plane, an excellent guiding for these plows while keeping a short overall length.

Instead of using three fork-shaped links associated with the three pairs of ring-shaped members, it is possible, as shown in Fig. 5, particularly for plowing with two alternate plows, to use only two fork-shaped links 24a and 24b, each attached to one ring of the central support 8 and to the ring of a support 12a or 12b.

The advantage of the independent height adjusting of the attachment supports 8, 12a and 12b by means of the hoisting devices 9, 13a and 13b is clearly stressed in Fig. 6. In this figure, the plows at the left are operating and the left driving wheel 5 lies in a previously dug furrow 25. The right wheel is in that case on a ridge and according to the plowing depth the tractor slants more or less.

Owing to the independent adjusting of devices 9 and 13a, on the one hand, the digging depth of plowshares 26a may be adjusted, and on the other hand, the pivoting joint 21a of the link 24a (see Fig. 5) may be simultaneously brought to an accurately horizontal position, this making equal the digging depths of each plowshare of the alternate multiple plows.

The same process is obviously performed in the case of link 24b when it is in operation.

Referring to Fig. 3, it is noticed that in order to allow this adjusting freedom, each link 24 comprises an axle 27 ending at both ends with a hook 28 freely engaged in a ring 15 and held in that ring by an annulus 29 and a pin 30. This same attachment method obviously applies to links 16, 17a, 17b in the case of Fig. 4.

As above, the simultaneous or alternate raising of the plows may be obtained by ordinary means, for instance by means of jacks 31 fed by a pump carried by the tractor.

What I claim is:

1. In combination with a tractor having two driving wheels, an implement attaching device comprising vertically displaceable support members located ahead of said wheels relatively to the direction of motion of said tractor; a pair of implement attaching means on each of said supports, said means lying on both sides of the corresponding wheel; a further vertically displaceable support member located centrally of the tractor; a further pair of attaching means on said last-mentioned support member, said means lying on both sides of the longitudinal plane of symmetry of the tractor; and means for adjusting independently of each other the position of said supports, whereby the height of the respective pair of attaching means above the ground is adjusted.

2. A combination according to claim 1 in which the implement attaching means are constituted by ring-shaped members fast with the corresponding support members.

3. A combination according to claim 1 in which the former-mentioned support members include a portion extending parallelly to the rotation axis of said wheels and carrying the attaching means, and a portion extending substantially perpendicularly to the former-mentioned portion and pivotally mounted at a point located in the vicinity of the axis of said wheels.

VINCENT P. M. BALLU.

References Cited in the file of this patent

UNITED STATES PATENTS

| Number | Name | Date |
| --- | --- | --- |
| 1,080,799 | Arbour et al. | Dec. 9, 1913 |
| 1,454,027 | Knudsen | May 1, 1923 |
| 1,595,217 | Orth | Aug. 10, 1926 |
| 1,759,252 | Coburn et al. | May 20, 1930 |
| 1,767,114 | Bashor et al. | June 24, 1930 |
| 2,023,050 | Higgins | Dec. 3, 1935 |
| 2,151,270 | Hamil | Mar. 21, 1939 |
| 2,164,543 | Peacock | July 4, 1939 |
| 2,295,898 | Hollis | Sept. 15, 1942 |
| 2,354,084 | Geraldson | July 18, 1944 |
| 2,407,006 | Harris | Sept. 3, 1946 |

FOREIGN PATENTS

| Number | Country | Date |
| --- | --- | --- |
| 529,664 | Germany | July 17, 1931 |